Nov. 8, 1955
J. R. GARDNER
2,722,760
SAFETY LATCH FOR CABLE CONTROLLED
EARTHMOVING SCRAPER BOWL
Filed Feb. 4, 1952
2 Sheets-Sheet 1
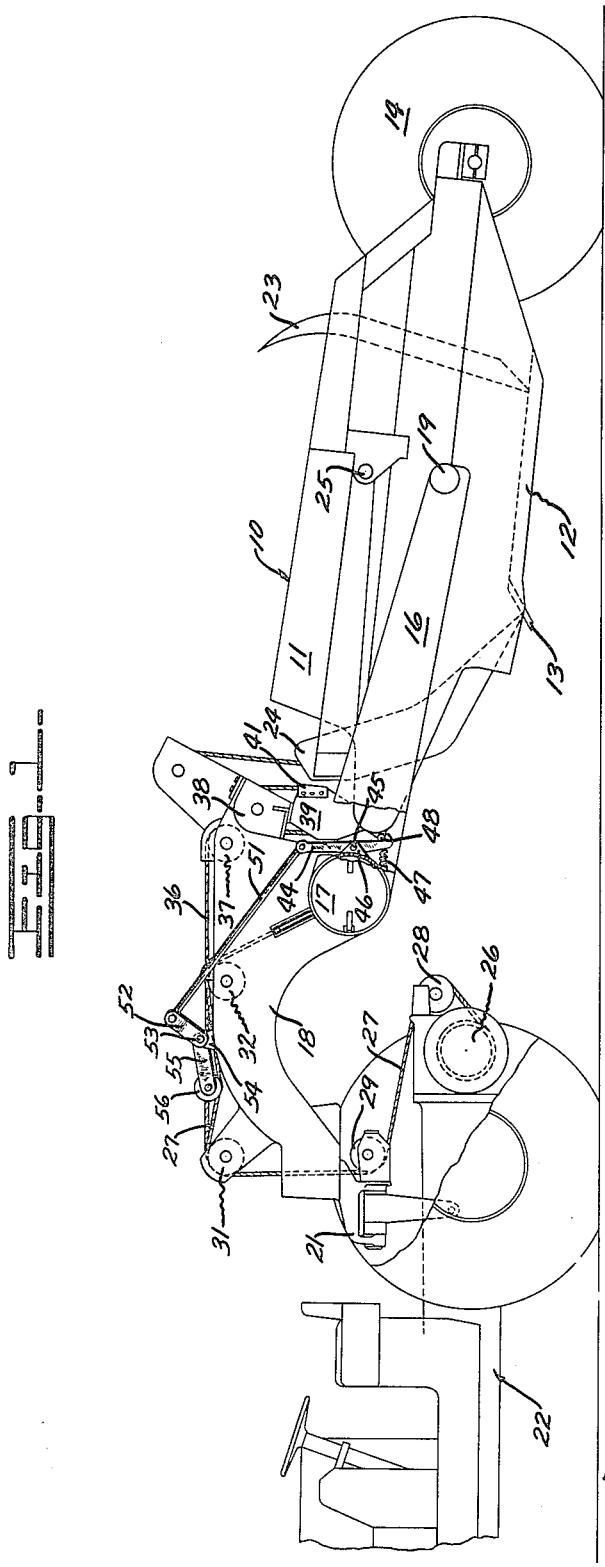
INVENTOR.
John R. Gardner
BY
Charles M. Fryer
ATTORNEY.

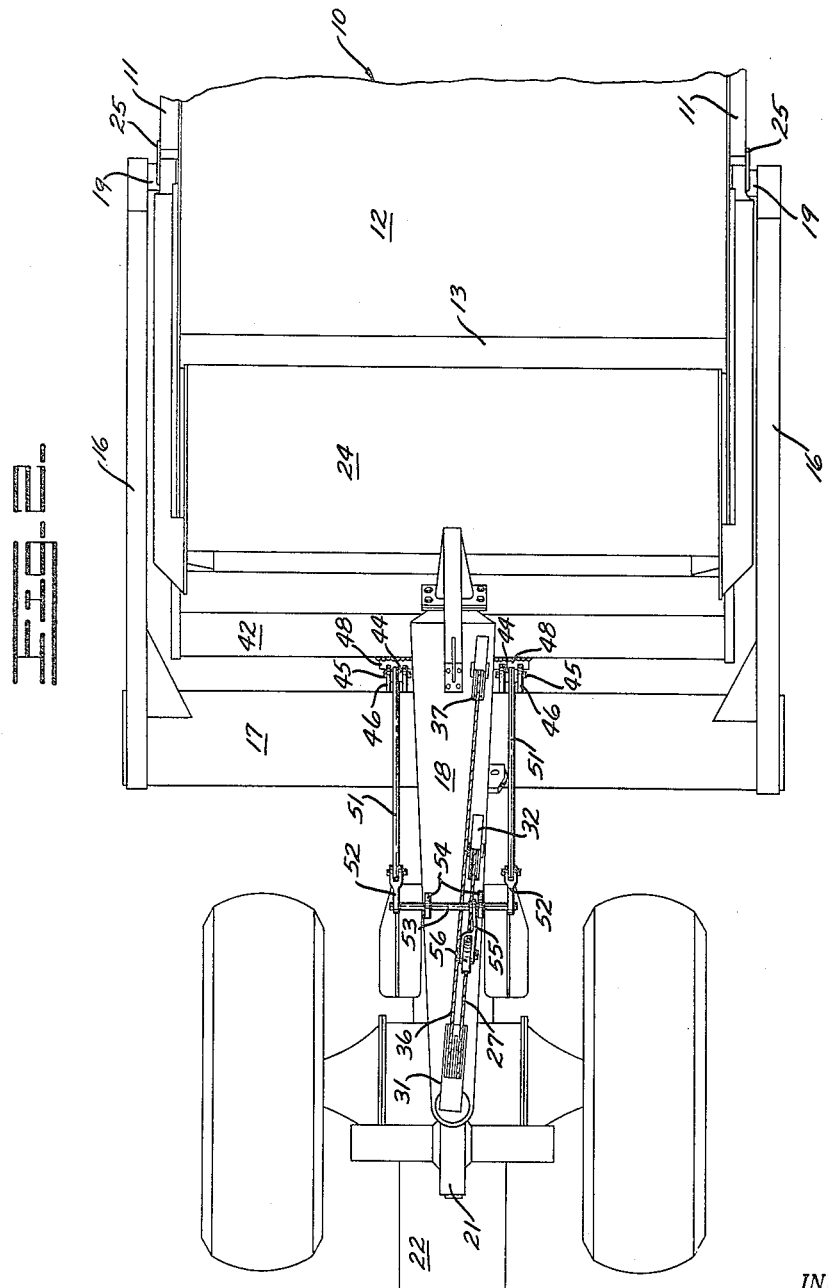

United States Patent Office 2,722,760
Patented Nov. 8, 1955

2,722,760

SAFETY LATCH FOR CABLE CONTROLLED EARTHMOVING SCRAPER BOWL

John R. Gardner, Murray, Utah, assignor to Caterpillar Tractor Co., Peoria, Ill., a corporation of California Application February 4, 1952, Serial No. 269,802

3 Claims. (Cl. 37—126)

This invention relates to a latching mechanism particularly adapted for use on a cable controlled earth-moving scraper to prevent accidental lowering of the scraper bowl.

One type of cable controlled scraper now commonly employed for collecting and moving large quantities of earth or like material comprises a large bowl supported on ground engaging wheels and having a draft connection by means of which it is connected to and drawn by a tractor unit. The bowl is adapted to be lowered into scraping contact with the earth to effect collection of material which is deposited in the bowl as the scraper is drawn forwardly. The rear of the bowl is closed by an ejector adapted for forward sliding movement to empty the bowl of its contents and at its forward end is provided with a gate-like device or apron which although normally open during loading or unloading may be swung downwardly or closed during transportation of the load. The scraper bowl is normally free to rock about the axis of the rear wheels of the scraper and at its forward end is supported by a cable extending forwardly to a cable-winding drum carried by the tractor. Both the ejector and apron are actuated by a single cable wound upon a second drum carried by the tractor. The cable winding drums are powered for rotation through a suitable power take off from the tractor to take in or pay out the cables at the control of the operator.

In a scraper of this type after the bowl is loaded it is returned to its carrying position by taking in on the cable and is held in this position during transportation of the load by the tension in the cable which is maintained by a brake on the cable winding drum. Such scrapers are frequently towed at relatively high speeds over rough terrain imposing high shock loads on the cable as well as the cable winding drum brake. As a result failure of either the brake or the cable occasionally occurs allowing the loaded bowl to drop into engagement with the earth bringing the scraper and tractor to an abrupt halt. Abrupt stops of this nature are detrimental to the tractor and scraper parts and under some conditions may result in injury to the tractor operator.

It is, therefore, an object of the present invention to provide a latch for locking the scraper bowl in its load carrying position to prevent accidental dropping or lowering of the bowl. It is another object of this invention to provide a latch mechanism for the bowl of an earthmoving scraper having means to automatically disengage the latch during loading and unloading of the scraper bowl.

Further objects and advantages of the present invention will be made apparent in the following specification wherein reference is made to the accompanying drawings.

In the drawings:

Fig. 1 is a view in side elevation of a cable controlled scraper embodying the present invention illustrated in its association with a tractor unit with parts broken away to more clearly illustrate the invention, and Fig. 2 is an enlarged fragmentary plan view of the scraper.

In Fig. 1 a cable controlled earthmoving scraper of the type in which the present invention is employed is illustrated as comprising an earth receiving bowl 10 having a pair of spaced side plates 11 and a bottom 12 which at its forward edge is provided with a scraping edge 13. Adjacent its rear end the bowl is supported by a pair of ground engaging wheels only one of which is illustrated at 14. Intermediate its ends the bowl is supported by a draft frame comprising spaced side arms 16 extending rearwardly from a tubular cross brace 17 and a forwardly extending draft arm 18. The spaced side arms are pivotally connected to the bowl sides by pins 19 and at its forward end the draft arm is supported by a universal hitch 21 to the rear of a wheel type tractor or the like indicated generally at 22. The rear of the bowl is closed by an ejector 23 adapted to be moved forwardly through the scraper bowl to eject its contents and at its forward end is closed by an apron 24 pivotally supported as at 25 from the sides of the scraper bowl to permit raising or opening during loading and unloading operations.

The tractor 22 carries a cable control unit of conventional construction which includes a pair of cable winding drums one of which is indicated in dotted lines at 26 powered for rotation by a rear power take-off shaft from the tractor. The function of the drums 26 is to take in or pay out cables for controlling the operation of the scraper. In the present example the apron and ejector of the scraper are controlled by a single cable 27 wound upon one of the drums 26 and led over a cable laying sheave 28, guide sheave 29 and then upwardly through the hollow center of a part of the universal connection 21. From the universal connection the cable is led over guide sheaves 31 and 32 carried on the draft arm 18 and then extends downwardly through tubular cross frame member 17 where it is associated with suitable traveling sheave blocks (not shown) to effect opening of the apron and then forward movement of the ejector upon taking in of the cable. Although the exact mechanism for accomplishing this is not shown there are several well-known ways of accomplishing this operation, one of which is illustrated in detail in my assignees Patent Number 2,573,765, issued November 6, 1951, entitled "Method and Apparatus for Operating an Earthmoving Scraper."

The scraper bowl 10 is adapted to be raised or lowered about the axis of its supporting wheels 14 to control the position of the blade 13 with respect to the ground. This raising and lowering of the scraper bowl is accomplished by a second cable 36 wound upon the other cable winding drum. The cable 36 leads from the drum over guide sheaves identical to and mounted in parallel relationship with sheaves 28, 29 and 31. From the sheave 31 the cable 36 passes over a guide sheave indicated at 37 and then back and forth between nests of sheaves (not shown) but which are enclosed within sheave blocks 38 and 39 and is anchored as at 41 to sheave block 39. The sheave block 38 is carried in the draft arm while sheave block 39 is carried on a tubular cross brace 42 extending between the sides of the scraper bowl at its forward end. By taking in or paying out on the cable 36 the forward end of the bowl 10 can be raised or lowered pivoting about the axis of its supporting wheels 14. Pivotal movement will also take place about the pins 19 between the draft frame arms 16 and the bowl sides as well as at the universal draft connection 21.

In operation, filling of the scraper bowl is accomplished by lowering its scraping edge 13 into contact with the earth and as the scraper is drawn forwardly by the tractor material will be deposited in the bowl. When the bowl is filled it may be raised by manipulation of cable 36 and drawn by the tractor to the desired place for discharge. Unloading of the scraper is accomplished by manipulation of the cable 27 to raise the apron 24 and then move the ejector forwardly through the bowl.

During transportation of the loaded scraper bowl it is retained in its load-carrying position by tension of the cable 36 which is maintained by a suitable brake associated with the cable winding drum. Such scrapers are frequently towed at relatively high speeds over rough terrain imposing severe shock loads on the cable and brake. Occasionally due either to slipping of the cable winding drum brake, failure of the cable 36, or due to the operator accidentally actuating the brake control, the bowl is lowered or dropped into contact with the earth's surface. Upon engagement of the bowl with the earth's surface the tractor and scraper are brought to an abrupt halt which usually damages both the tractor and the scraper and under some conditions can cause injury to the tractor operator.

In the present invention accidental lowering of the scraper bowl is prevented by the provision of a pair of latches one of which is disposed on each side of the draft arm 18 locking the scraper bowl to the draft frame when the bowl is in its load carrying position. Each of the latches comprises a latch lever 44 pivotally supported intermediate its ends by a pin 45 carried in spaced ears 46 secured to the tubular cross brace 17. A spring 47 interposed between the lever and tubular cross brace urges the latch end of the lever into engagement with a pin 48 extending from the forward edge of the bowl cross brace 42. At their opposite ends the levers 44 are connected by links 51 to levers 52 fixed on the opposite ends of a shaft 53 carried for rocking movement in ears 54 extending from the draft arm 18. The shaft 53 also carries a lever 55 which at its extending end carries a roller or pulley 56 adapted to engage the cable 27 employed for actuating the apron and ejector. When the scraper bowl is in its load carrying position the cable 27 is normally slack permitting the latch levers 44 to be rocked by the springs 47 into latching engagement with the pins 48 preventing accidental lowering of the scraper bowl. Movement of the latches out of the path of the pins to permit lowering of the scraper bowl is accomplished by tensioning of the cable 27 preparatory to actuating the bowl apron and ejector. Tensioning of the cable 27 rocks the lever 55 and shaft 53 in a clockwise direction as viewed in Fig. 1 swinging the levers 44 out of the path of the pins 48. With the levers in this position the scraper bowl may be lowered for loading in the normal manner.

With the latching structure described a cable must be tensioned to release the scraper bowl. This cable is not likely to break nor is the drum upon which it is wound controlled by a brake in the load carrying position. The security of the latch therefore does not depend upon the strength of a cable nor the condition of a brake.

I claim:

1. In an earthmoving scraper having a frame and a bowl at least partially supported by the frame, mechanism including a cable acting between the frame and the bowl for raising the bowl free of contact with the ground, a latch between the frame and the bowl to hold the bowl in its raised position, latch release means on the frame associated with said latch, other cable controlled mechanism on the scraper including another cable having a part adjacent said latch release means, and means on the frame supporting said other cable part in a position to contact and actuate the release means when said other cable is tensioned.

2. In an earthmoving scraper having a frame and a bowl at least partially supported by the frame, mechanism including a cable acting between the frame and the bowl for raising the bowl free of contact with the ground, a latch between the frame and the bowl to hold the bowl in its raised position, latch release means associated with said latch, an apron on the bowl movable between open and closed positions with respect to the front of the bowl, an apron cable connected with the apron for moving it to an open position and having a part adjacent the latch release means, said part being supported to engage and actuate the release means when the apron cable is tensioned preparatory to opening the apron.

3. In an earthmoving scraper having a bowl open at its forward end, a normally closed apron on the bowl movable to an open position, ground engaging wheels supporting the bowl at one end, frame means pivotally supporting the bowl intermediate its ends, a cable acting between the frame and the bowl for raising and lowering the bowl, a second cable passing between the frame and apron for opening the apron, releasable latch means carried by the frame to prevent lowering of the bowl from its raised position, and means on said frame means supporting said second cable in a position to engage and release said latch means upon the initial tensioning of the second cable to effect opening of the apron.

References Cited in the file of this patent

UNITED STATES PATENTS

| 2,168,318 | Brodersen et al. | Aug. 8, 1939 |
| 2,306,892 | McGlade | Dec. 29, 1942 |
| 2,330,113 | Daniels | Sept. 21, 1943 |
| 2,337,297 | McGlade | Dec. 21, 1943 |
| 2,386,192 | Brimhall | Oct. 9, 1945 |
| 2,445,053 | Allin | July 13, 1948 |
| 2,573,765 | Gustafson | Nov. 6, 1951 |